(12) United States Patent
Pinkard

(10) Patent No.: US 11,954,172 B2
(45) Date of Patent: Apr. 9, 2024

(54) ONE-TO-MANY RANDOMIZING INTERFERENCE MICROSCOPE

(71) Applicant: Photomics, Inc., Berkeley, CA (US)

(72) Inventor: Henry Pinkard, Berkeley, CA (US)

(73) Assignee: Photomics, Inc., Berkeley, CA (US)

( * ) Notice: Subject to any disclaimer, the term of this patent is extended or adjusted under 35 U.S.C. 154(b) by 104 days.

(21) Appl. No.: 17/881,415

(22) Filed: Aug. 4, 2022

(65) Prior Publication Data

US 2023/0043414 A1 Feb. 9, 2023

Related U.S. Application Data

(60) Provisional application No. 63/229,762, filed on Aug. 5, 2021.

(51) Int. Cl.
| | |
|---|---|
| *G06F 18/21* | (2023.01) |
| *G02B 21/00* | (2006.01) |
| *G02B 21/02* | (2006.01) |
| *G02B 21/06* | (2006.01) |
| *G02B 21/36* | (2006.01) |
| *G02B 26/02* | (2006.01) |

(52) U.S. Cl.
CPC ......... *G06F 18/21* (2023.01); *G02B 21/0092* (2013.01); *G02B 21/02* (2013.01); *G02B 21/06* (2013.01); *G02B 21/361* (2013.01); *G02B 26/023* (2013.01)

(58) Field of Classification Search
None
See application file for complete search history.

(56) References Cited

U.S. PATENT DOCUMENTS

| | | | |
|---|---|---|---|
| 6,038,041 A * | 3/2000 | Poon | G02B 21/06 359/30 |
| 2016/0003740 A1* | 1/2016 | Tao | G01N 21/6428 250/201.3 |
| 2019/0212124 A1* | 7/2019 | Zalevsky | G01B 11/162 |
| 2019/0269331 A1* | 9/2019 | Alford | A61B 5/6803 |

* cited by examiner

*Primary Examiner* — Eileen M Adams
(74) *Attorney, Agent, or Firm* — Kaplan Breyer Schwarz, LLP

(57) ABSTRACT

A computational microscope and a method for its operation are disclosed. In some embodiments, the microscope maps points on a sample to point in an intensity pattern on a one-to-many basis. The microscope utilizes illumination angle coding, polarization coding, amplitude coding, and phase coding to capture more information than prior art computational microscopes. Although the resulting intensity patterns are not human-interpretable images of the sample, they contain more information about the sample, by virtue of the aforementioned coding techniques, than is captured by prior-art microscopes. Machine-learning algorithms, such as neural networks, are used to analyze the intensity patterns and extract useful information, such as cellular events or cell behavior.

17 Claims, 12 Drawing Sheets

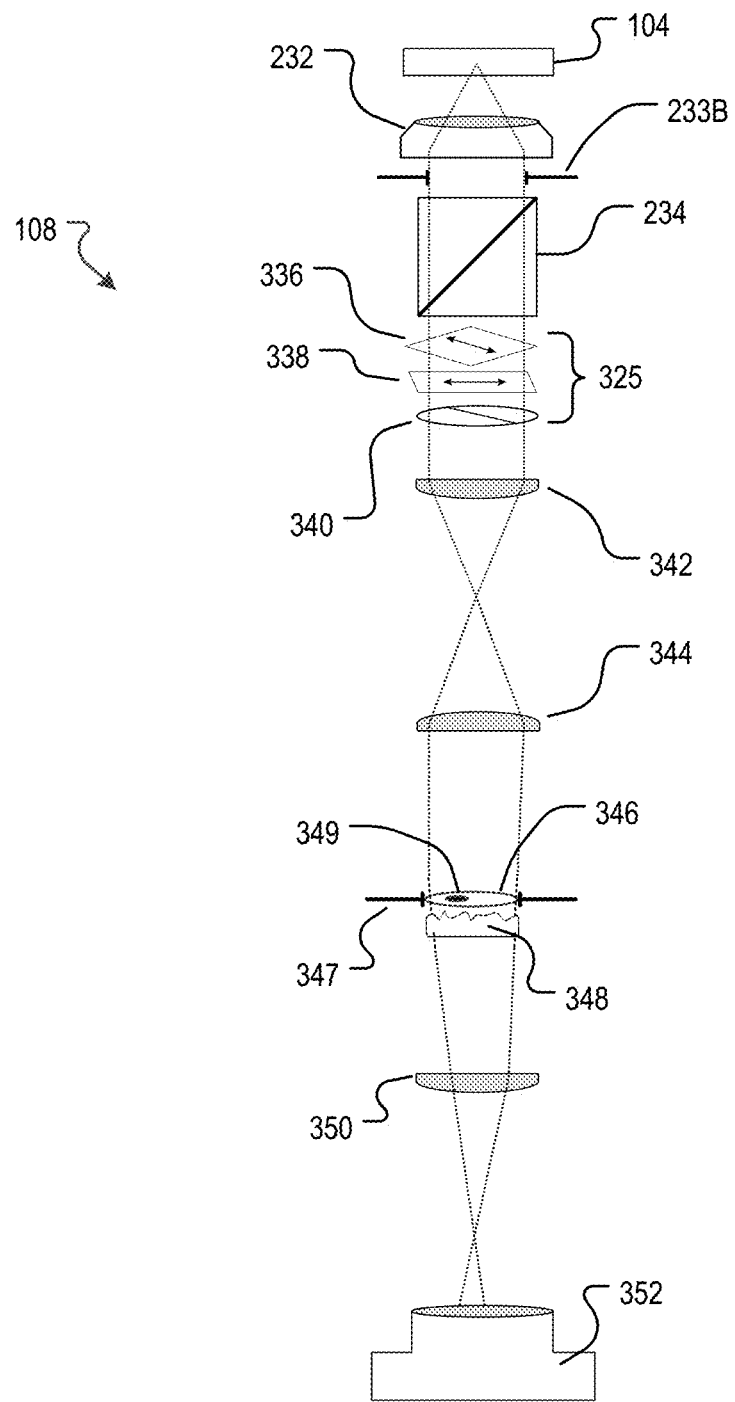

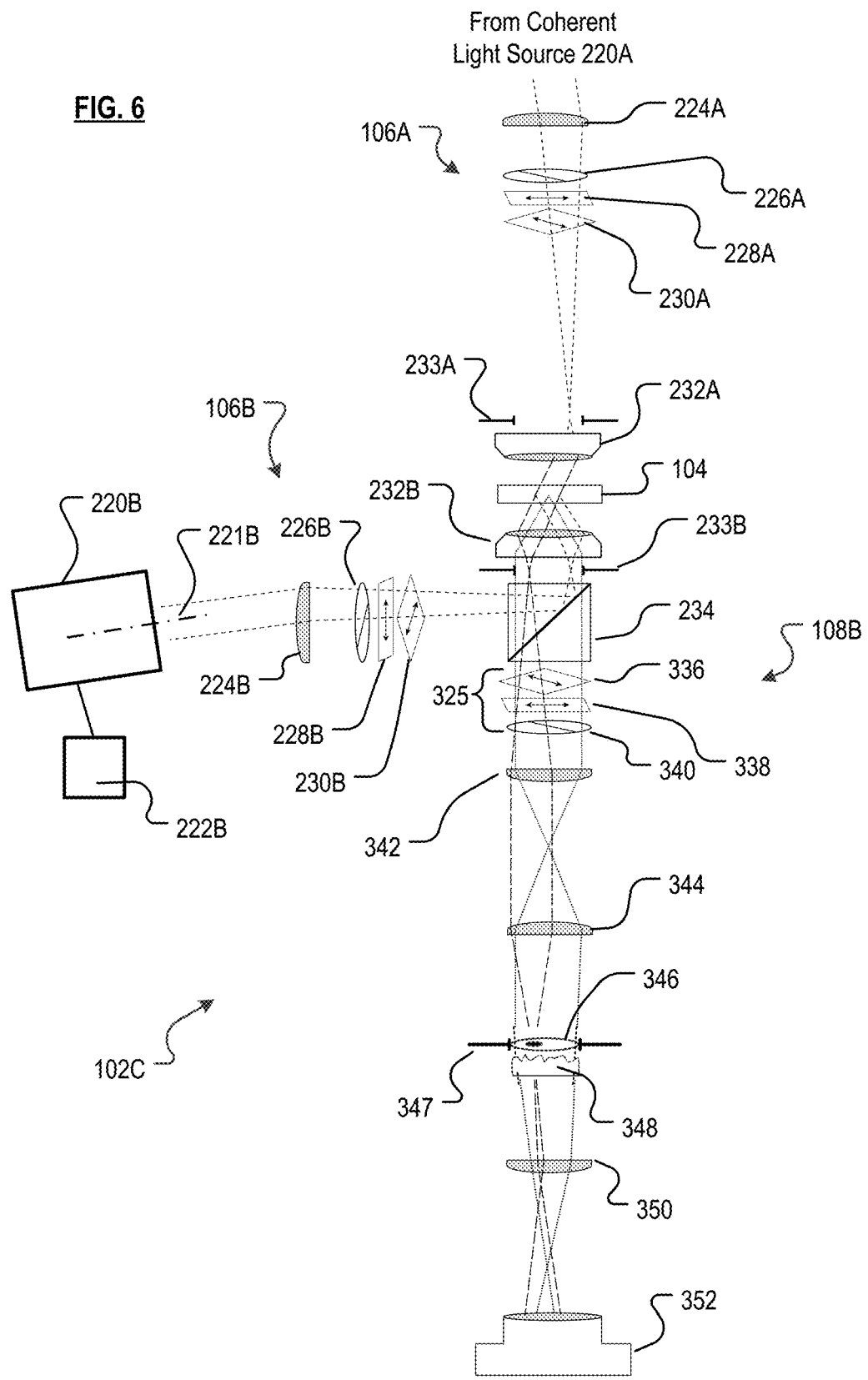

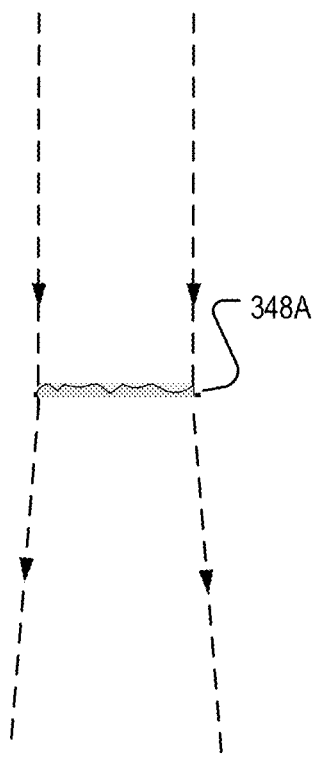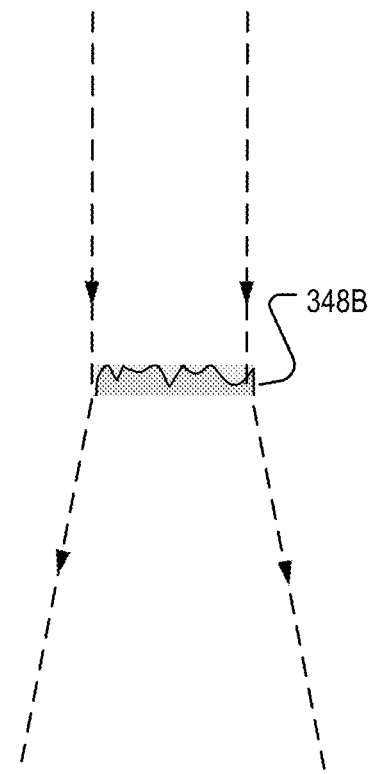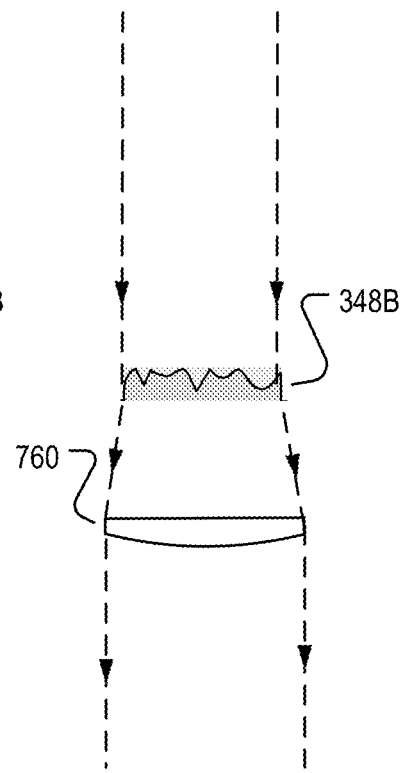

ONE-TO-MANY RANDOMIZING INTERFERENCE MICROSCOPE

STATEMENT OF RELATED CASES

This case claims priority of U.S. Ser. No. 63/229,762 filed Aug. 5, 2021, which is incorporated herein by reference. If there are any contradictions or inconsistencies in language between this specification and one or more of the cases that have been incorporated by reference, the language of this specification takes precedence and controls interpretation of the claims herein.

FIELD OF THE INVENTION

This invention relates to microscopy, and more particularly to computational microscopy.

BACKGROUND OF THE INVENTION

The "space-bandwidth product" (SBP) may be considered to be the maximum amount of information that can be captured by an optical imaging system. The SBP is defined as the field-of-view (FOV) of the imaging system divided by its spatial resolution. The higher the SBP, the more information can be acquired.

For a microscope objective, the numerical aperture (NA) and magnification are the key parameters that determine FOV and spatial resolution. Due to the challenges and costs of engineering an objective lens with a high FOV and high NA, the SBP of an optical microscope is typically increased via an objective with relatively lower magnification and higher numerical aperture. As a practical matter (due to engineering challenges, etc.), as the numerical aperture increases, the geometric aberrations of the optical elements of the system increase as well. There is thus a tradeoff between FOV and achievable image resolution. The ability to increase the SBP of a conventional optical microscope is therefore limited.

Images with a higher space-bandwidth product can be captured using an optical microscope that incorporates computational imaging techniques. In computational microscopy, algorithmic reconstruction is combined with image capture to obtain images of microscopic objects. The computational microscope does not obtain a direct image of the sample; in fact, the raw measurements obtained are sometimes not interpretable via human examination. Rather, such measurements are converted into a human-interpretable image of the sample by solving a so called "inverse problem" based on a model of the system's physics.

Ultimately, the SBP governs the theoretical maximum amount of information that a microscope can collect from a sample. But the SBP doesn't speak to the amount of information that is actually collected by a given microscope. And developments in computational microscopy and related disciplines notwithstanding, there is a need for a microscope that can capture more of that information than prior-art microscopes.

SUMMARY

The present invention provides a microscope that avoids some of the disadvantages and limitations of the prior art. Among other features, embodiments of the invention provide a computational microscope that is capable of capturing more information about a microscopic sample, such as biological sample, than prior-art computational microscopes.

Prior-art microscopes form intensity patterns—specifically, images—that contain enough information about a sample to create contrast in the detected image. Historically, optical imaging systems (e.g., microscopes, consumer cameras, telescopes, etc.) have been designed to form a direct optical image of a sample. Such an image is readily recognizable by a human as an image of the sample. To create such an image, these devices focus light coming from a single point on an object to a single point on a detector (although imperfectly due to geometric aberrations). It is this point-to-point mapping that forms a direct optical image.

In fact, many optical-system designers consider deviating from this point-to-point paradigm to be problematic. Consider, for example, an abberated optical system. An "aberration" is a property of optical systems that causes light to spread rather than focus to a point. This causes the image formed by the optical system (e.g., lens, etc.) to blur or distort, hence degrading the resolution and performance of the system. Indeed, manufacturers of optical instruments must correct optical systems to compensate for aberration.

Embodiments of the invention provide a microscope that captures more information about a sample than prior-art microscopes, including prior-art computational microscopes. Among other reasons for this, some embodiments of the invention map object points to intensity-pattern points on a one-to-many basis, rather than on a one-to-one basis, as in the prior art. These intensity patterns, which may look like random noise, are then interpreted by algorithms appropriate to the task.

The applicant recognized that the preference in the prior art for point-to-point mapping is based on a strong bias for creating human-interpretable images. The applicant further recognized that: (1) due to advances in computer vision, there are many applications in which there is no need for an imaging system to provide a human-interpretable image, and (2) in some applications, there are good reasons not to. That is, if one is willing to alter the criterion from "interpretable-by-humans" to "interpretable-by-machines," the system design shifts toward capturing an intensity pattern that can contain far more information about a sample than would otherwise be possible. Moreover, certain information is simply not extractable via inspection of a human-interpretable image.

The performance of embodiments of the invention exceeds that of prior-art computational microscopy systems that ultimately seek to render a human-interpretable image. The reason for this is that embodiments of the invention capture information for which appropriate physical models for converting the raw data into a human-interpretable image have not yet been developed. Consequently, prior-art imaging systems would not and cannot pursue the approaches taken by applicant (e.g., one-to-many mapping, high-angle polarized-light backscattering, etc.). More particularly, for systems intended to generate a human-interpretable image, the requisite processing would require a complicated vectorial wave-optics model, which would preclude many of the simplifying assumptions typically made in modelling (e.g., a scalar diffraction instead of vector diffraction, linear models instead of non-linear models, etc.).

As a practical matter, it is currently not possible for optical systems that form a human-interpretable image to capture as much information as embodiments of the invention. For this reason, some embodiments of the invention use computer vision algorithms that employ machine learning, such as neural networks, for processing. Such models are flexible enough to extract information that cannot be extracted via simple mathematical models.

In order for the algorithms to extract useful information, a calibration process is required, as will be appreciated by those skilled in the art. That is, there must be some knowledge of the intensity-pattern-formation process. A traditional imaging system maps a point to a slightly blurry version of that point. As previously noted, some embodiments of the invention map a point to a random-looking pattern. In this context, "calibration" means understanding that mapping.

One application for which embodiments of the invention are particularly well suited is that of acquiring information about a biological sample, such as a cell or group of cells. As previously noted, the optics of the present microscope forms an intensity pattern on a detector, such as a camera. As previously noted, this intensity pattern might appear to a human as nothing more than noise. A digitized version of the intensity pattern is then input into a computer vision system. In the computer vision system, a processor implements the steps of an algorithm, such as a neural network, for extracting information and converting it into a useful form. In this case, a "useful form" is not necessarily a human-interpretable image, but more advantageously an evaluation of cellular events and/or cell behavior.

Embodiments of the invention belong to a class of imaging techniques referred to as "label-free," since the cells being optically interrogated have not been chemically or biologically altered in any way to produce contrast. Label-free imaging avoids certain disadvantages associated with fluorescence microscopy and other chemical-labelling techniques. For example, the high-intensity light required for fluorophore excitation can result in toxicity for live cells. Although many light-absorbing dyes, such as often used for pathology, operate at lower light intensities than fluorescence microscopy, the dyes themselves are typically toxic, and are often only applied to dead cells. In addition, the labelling process is inherently stochastic and adds an additional source of noise to images.

By contrast, in label-free imaging, the cells are analyzed in an unperturbed state; consequently, findings tend to be more biologically relevant than would otherwise be the case. Label-free imaging is capable of identifying and quantifying various cellular events (e.g., cell division, motility, death, etc.), the disruption of which can result in various diseases. As a consequence, label-free imaging can provide significant insight into cell behavior. Moreover, label-free imaging is also a less expensive and faster methodology than fluorescence microscopy or chemical-labelling.

As those skilled in the art will appreciate, biological cells absorb little to no light, and therefore are not readily amenable to conventional bright-field microscopy, which simply measures the absorbance of light. Certain additional techniques are therefore used; namely phase contrast and polarization microscopy. In phase-contrast microscopy, image contrast arises from the extent to which cells change the phase of the illuminating light due to variations in their refractive index. In polarization microscopy, refractive index changes as a function of the polarization of the illuminating light, due to the presence of anisotropic structures, like cell membranes, or the cell cytoskeleton. These techniques, while known in the art, are employed in unconventional ways and in unconventional optical architectures in some embodiments of the present invention.

As previously mentioned, one useful application for embodiments of the invention is imaging biological samples; such embodiments are particularly useful for imaging samples in multi-well plates. For such an application, traditional imaging systems are designed to produce as closely as possible a "one-to-one," mapping because that increases the nominal resolution of the system. There has also been a focus in the prior art on transmission-mode imaging for such applications. Specifically, transmission-mode imaging avoids reflection-mode imaging issues, such as having to capture a weak, back-scattered signal, suppressing reflections from the optical train that carry no information about the sample, dynamic range issues, and the like. Notwithstanding the foregoing, a reflection geometry is better suited for multi-well plate imaging because it's easier to have a clear optical path below the sample (i.e., a flat piece of glass) than above, where the light has to pass through the meniscus of the water that fills the well, introducing unwanted lensing effects. In some embodiments of the invention, wherein both transmission-mode and reflection-mode imaging is employed, multiple degrees of freedom are available to modulate the reflected light and address many of the aforementioned issues arising with a reflection-mode image.

In summary, a key insight of the applicant is that the more interference that is present, the more information can be encoded. The reasons are beyond the scope of this disclosure, but are based on information theory. Simply put, more interference produces intensity patterns that have "better" statistical characteristics. Higher contrast is necessary for these better characteristics. Random-looking images, which by definition have high contrasts, are preferred.

Embodiments of the invention provide "more" interference by ensuring that the illumination light is suitable; in particular, it should be sourced from monochromatic coherent sources. And the interrogating light should be from the same source. In this regard, light from two lasers of the same wavelength will not interfere because they experience many fast, random changes in relative phase compared to one another, which tend to average out interference effects that would otherwise be present. An additional source of interference is "randomization," so that interference patterns are more complicated (i.e., random looking), which results from each point on the detector receiving light from many parts of the sample.

Embodiments of the invention use one or more of the following features to capture an unprecedented amount of information from a sample:

1. Illumination angle coding; obtaining intensity patterns formed with variety of angles of illuminating light. In weakly scattering biological specimens, such as cells on a coverslip, illumination of the sample with a plane wave will scatter light in all directions. A linear approximation of this process reveals that different angles of scattered light approximately contain information about different spatial frequencies of the contents of the sample. From the perspective of collecting as much information as possible, it is advantageous to collect as wide a range of these spatial frequencies as possible. Reflection and transmission illumination will collect backscattered and forward scattered light, respectively, which contain complementary information about the sample.

2. Polarization coding; obtaining intensity patterns using different polarizations and polarization/angle combinations. Many biological samples are birefringent; that is, light passing through them experiences different a refractive index depending on its polarization. Controlling polarization of the illumination light and the detection light enables accessing information about these structures. Furthermore, it serves as a useful feature to select for scattered light, which will have different polarization than unscattered light.

3. Amplitude coding in the detection path. This enables the attenuation of specific angles of light in the detection path. This is useful because the unscattered light (in the case of transmission geometry) or specularly reflected light (in the case of reflection geometry) will have a much higher amplitude than the scattered light. By specifically attenuating (either reducing or blocking altogether) the unscattered component, the scattered light will be captured with much better contrast and signal-to-noise ratio. A similar principle is employed in Zernike Phase Contrast.

4. Phase coding in the detection path. Since the detector will only capture amplitude information of the intensity pattern, not its phase, making multiple types of measurements with phase diversity (e.g., different phase codes in an aperture conjugate plane) will make the phase variations of the incident light on the detector, which cannot be measured, show up as intensity variations, which can be measured.

Although some of such techniques are known in the art, such techniques are used in unconventional architectures in embodiments of the invention.

In some embodiments, the invention provides a system comprising microscope optics that includes:

first illumination optics for launching first coherent light within a range of controllable angles, establishing a first polarization of the launched first coherent light, and delivering an angled plane wave having the first polarization to a sample; and detection optics, wherein the detection optics includes:
(a) an objective lens that receives ballistic light and scattered light, both originating from the angled plane wave delivered to the sample, wherein the ballistic light is not scattered by the sample, and the scattered light is scattered by the sample,
(b) a detection-optics universal polarizer for selecting a second polarization of the ballistic light and the scattered light,
(c) an attenuating/phase-shifting mask for attenuating the ballistic light and shifting a phase thereof, wherein the ballistic light is attenuated to substantially match an intensity of the scattered light, and wherein the mask is disposed in a plane that is conjugate to a back aperture of the objective lens;
(d) a first randomizer that scatters the attenuated ballistic light, and further scatters the scattered light; and
(e) a detector for receiving an intensity pattern formed from interference between the attenuated ballistic light and the scattered light.

In some embodiments, the invention provides a method for generating a first intensity pattern of a sample via a microscope, wherein the method comprises:

launching, at a first angle, coherent illuminating light into first illumination optics;

establishing a desired polarization for the coherent illuminating light;

imaging the coherent illuminating light having the desired polarization onto the sample;

receiving, at a universal polarizer, ballistic light and scattered light, both originating from the coherent illuminating light imaged onto the sample, wherein the ballistic light is not scattered by the sample, and the scattered light is scattered by the sample, and selecting a desired polarization for the ballistic and scattered light;

attenuating the ballistic light to substantially equalize the intensity thereof to the intensity of the scattered light, and altering a phase of the ballistic light;

randomizing the ballistic light and the scattered light; and detecting a first intensity pattern resulting from interference between the ballistic light and the scattered light, digitizing, and storing the first intensity pattern.

BRIEF DESCRIPTION OF THE DRAWINGS

FIG. 3 depicts an illustrative embodiment of detection optics of the computational microscope of FIG. 1.

FIG. 6 depicts a third embodiment of microscope optics of the computational microscope of FIG. 1, wherein the microscope optics include both the transmission and reflection geometry illumination optics as shown in FIGS. 2A and 2B, respectively, and an embodiment of the detection optics of FIG. 3 including both a randomizer and an attenuating/phase-shifting mask.

FIGS. 7A and 7B depict the affect that randomizer surface roughness has on the spread of light.

FIG. 7C depicts the use of a convex lens in conjunction with a randomizer for use in some embodiments of the detection optics of FIG. 3.

DETAILED DESCRIPTION

The following terms are defined below for use in this disclosure and the appended "Image" means an intensity pattern, such as generated by a microscope, that is a direct optical image; that is, a human-interpretable image as a consequence of one-to-one mapping.

"Ballistic Light" is light that is not scattered from a sample.

Additional definitions are provided in the specification in context.

Figure 1:
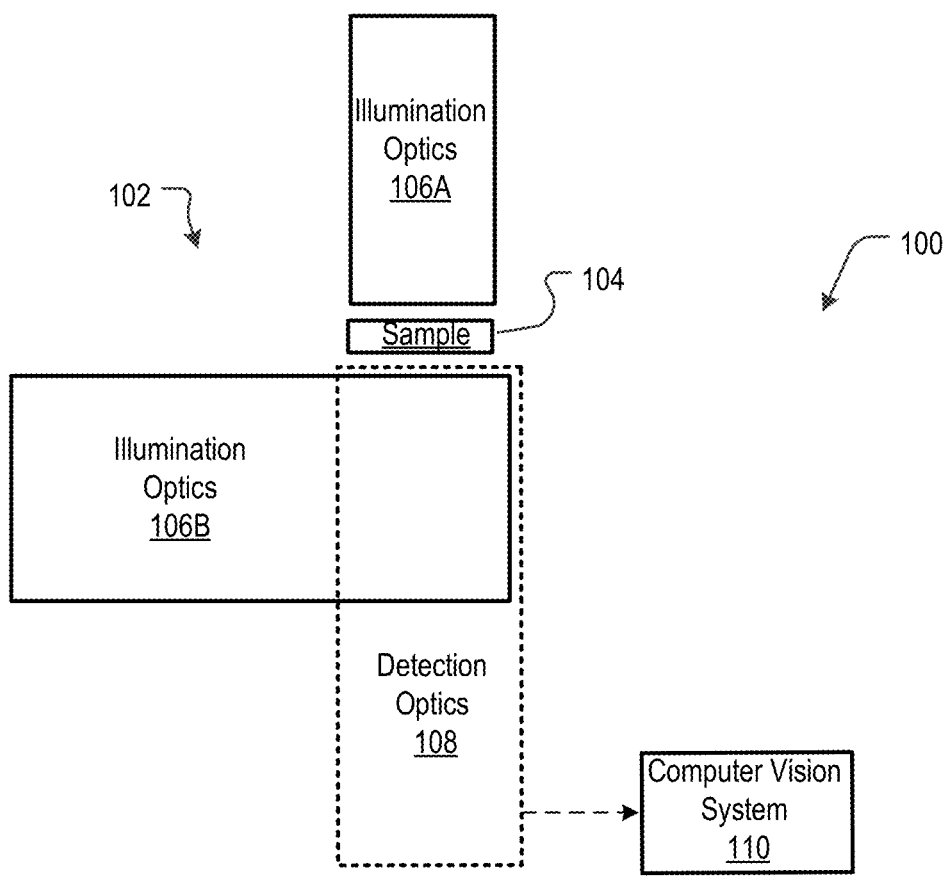
FIG. 1 depicts a computational microscope in accordance with the illustrative embodiment of the present invention.

FIG. 1 depicts computational microscope 100 in accordance with the illustrative embodiment of the present invention.

Computational microscope 100 includes microscope optics 102 and computer vision system 110. In the illustrative embodiment depicted in FIG. 1, microscope optics 102 includes illumination optics 106A, illumination optics 106B, and detection optics 108, interrelated as shown. Microscope optics 102 generates an intensity pattern for a sample, such as sample 104. In conjunction with computer vision system 110, information about the sample can be extracted from the intensity pattern. It is notable that for some embodiments of microscope optics 102, the intensity pattern generated may not be human-interpretable on visual inspection.

Illumination optics 106A and illumination optics 106B provide light for illuminating sample 104. Illumination optics 106A operates in a transmissive geometry and illumination optics 106B operates in a reflection geometry. It is notable that in operation, only one or the other of illumination optics 106A or 106B are used at a time. In various embodiments, microscopes in accordance with the present teaching can include only illumination optics 106A, only illumination optics 106B, or, both illumination optics 106A and 106B.

By virtue of the components within the illumination optics, which include a coherent light source and universal polarizer among other optical elements, the illumination optics are operable to illuminate a sample at an arbitrary angle and polarization. Illumination optics 106A and 106B are described in further detail in conjunction with FIGS. 2A and 2B.

Light reflected from sample 104, whether sourced from illumination optics 106A or 106B, enters detection optics 108. As indicated by the "overlap" of the illumination optics 106B and detection optics 108, some optical elements (notably an objective and a beam splitter) are shared between these two systems. In operation, detection optics 108 selects for a particular polarization, and applies aperture coding. The aperture coding may involve (i) randomization of the image (of the sample) using a diffuser, and/or (ii) attenuation/phase delay of incident light. An intensity pattern is ultimately delivered to a detector, such as a camera, within detection optics 108. The detection optics is discussed in more detail in conjunction with, for example, FIGS. 3-6.

The intensity pattern generated by microscope optics 102 is digitized and transmitted to computer vision system 110. The computer vision system processes the intensity pattern using an appropriate algorithm, as described further in conjunction with FIGS. 3 and 8.

Figure 2A:
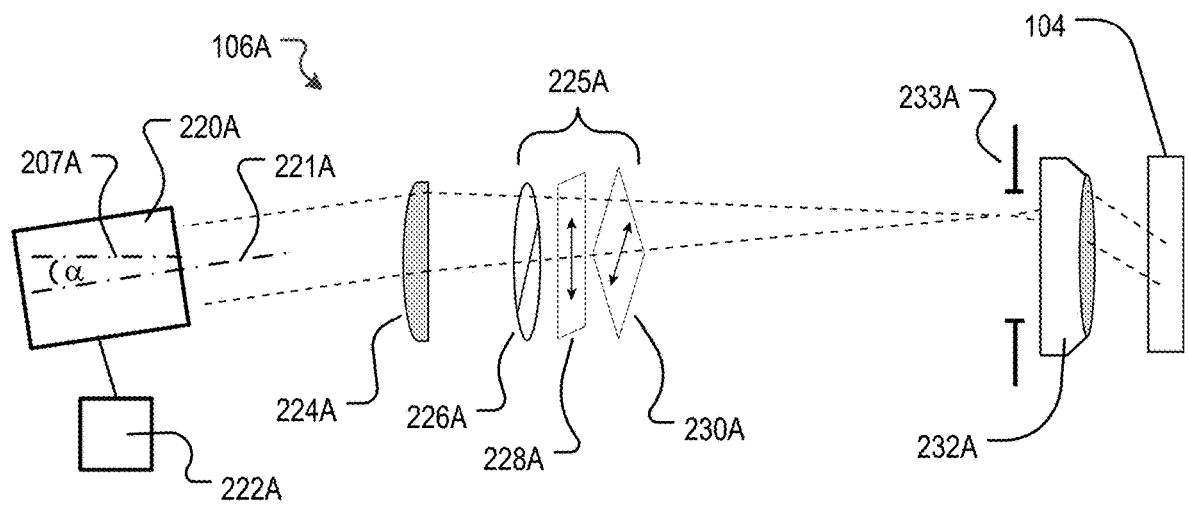
FIG. 2A depicts a first embodiment of illumination optics of the computational microscope of FIG. 1, wherein the illumination optics operates in a transmission geometry.

Illumination Optics. FIG. 2A depicts illumination optics 106A of computational microscope 100 in accordance with the present teachings. The short, dashed lines depict the path of illumination light through illumination optics 106A, which operates in a transmission geometry. Illumination optics 106A provides a collimated, coherent beam of light with a controllable angle that is transformed, via various optics, into an angled plane wave having a particular polarization that is incident on sample 104.

Illumination optics 106A includes coherent light source 220A, positioner 222A, tube lens 224A, linear polarizer 226A, variable waveplate 228A, variable waveplate 230A, and objective 232A.

In the illustrative embodiment, coherent light source 220A is a laser. The illuminating light must be spatially coherent so that an interference pattern forms on the detector in the detection optics. Higher-power illumination sources are preferable, because they are capable of forming intensity patterns with a relatively greater dynamic range. Moreover, the relatively narrow spectral bandwidth of a laser is advantageous for maximizing interference effects. The orientation of coherent light source 220A (i.e., it's optical axis 221A) relative to optical axis 207A of illumination optics 106A is controllable via positioner 222A. That is, coherent light emanating from coherent light source 220A can be angled, as indicated via angle $\alpha$, relative to the optical axis 207A of illumination optics 106A. Useful information about a sample can be obtained by conducting plural observations with the incoming light directed at different angles $\alpha$. It is within the capabilities of those skilled in the art to select a suitable range of angles by which direction of light emitted from coherent light source 220A can be varied, as a function of other elements within illumination optics 106A.

In some other embodiments, a source of illumination other than a laser is used, such as an LED. If non-laser sources are used, some method for achieving spatial coherence must be used. For example, an angular filter can be applied to the light emitted from an LED.

Light exiting coherent light source 220A is incident upon tube lens 224A, and after passing therethrough, passes through universal polarizer 225A, which is an optical element (or plural elements) that can transform the incident light into any desired polarization state. In the illustrative embodiment, universal polarizer 225A is implemented by linear polarizer 226A followed by electrically tunable waveplates 228A and 230A. The waveplates are oriented 45 degrees with respect to one another. Linear polarizer 226A may be considered optional since the light from coherent light source 220A should be linearly polarized. However, to the extent there are any deviations from linear polarization in the incoming light, linear polarizer 226A will rectify that.

The distance between tube lens 224A and linear polarizer 226A/waveplate 228A/waveplate 230A, if present, should be small as practical to spread light out over a larger area and thus minimize intensity on waveplates 228A and 230A (to avoid damage thereto). The light passing from universal polarizer 225A is focused at the back focal plane 233A of objective 232A, which directs an angled plane wave with a particular polarization onto sample 104.

Figure 2B:
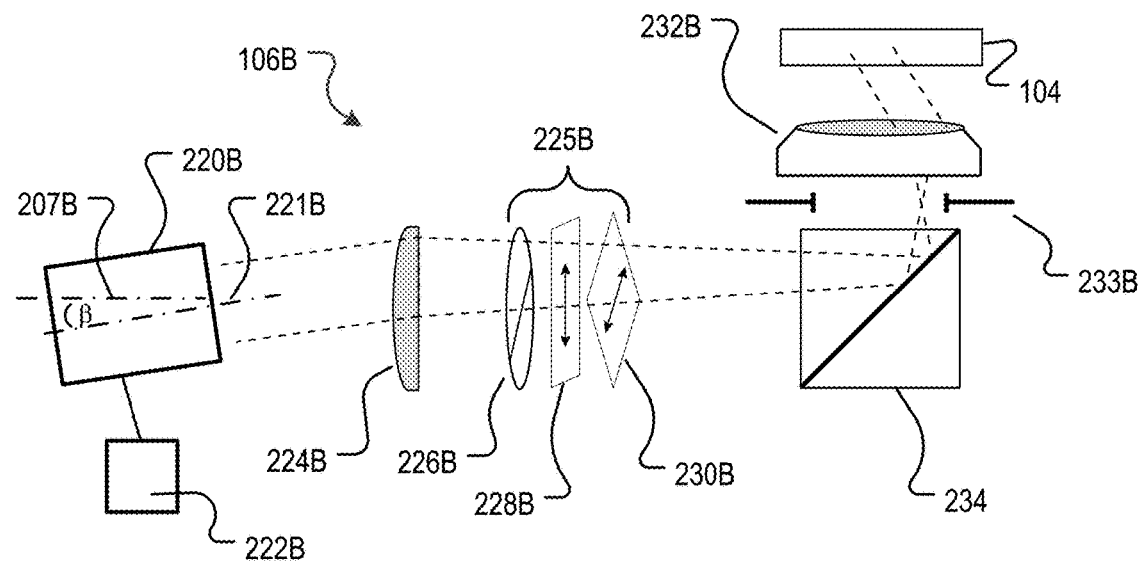
FIG. 2B depicts a second embodiment of illumination optics of the computational microscope of FIG. 1, wherein the illumination optics operates in a reflection geometry.

FIG. 2B depicts illumination optics 106B of computational microscope 100 in accordance with the present teachings. The short, dashed lines depict the path of illumination light through illumination optics 106B, which operates in a reflection geometry. Like illumination optics 106A, illumination optics 106B provides an angled plane wave with a particular polarization incident on sample 104.

Illumination optics 106B includes coherent light source 220B, positioner 222B, tube lens 224B, linear polarizer 226B, waveplate 228B, waveplate 230B, non-polarizing beam splitter 234, and objective 232B.

Illumination optics 106B functions in substantially the same manner as illumination optics 106A. And there is not necessarily any difference between like optical elements in the two illumination optics systems. Non-polarizing beam splitter 234 directs the light from universal polarizer 225B to objective 232B.

The orientation of coherent light source 220B (i.e., it's optical axis 221B) relative to optical axis 207B of illumination optics 106B is controllable via positioner 222B. That is, coherent light emanating from coherent light source 220B can be angled, as indicated via angle β, relative to the optical axis 207B of illumination optics 106B. Useful information about a sample can be obtained by conducting plural observations with the incoming light directed at different angles β. It is within the capabilities of those skilled in the art to select a suitable range of angles by which direction of light emitted from coherent light source 220B can be varied, as a function of other elements within illumination optics 106B.

As previously noted, embodiments of computational microscope 100 can include either one or both of illumination optics 106A and 106B for providing illuminating light to sample 104. As previously noted, in embodiments in which both illumination optics 106A and 106B are included, only one is used at a time. The benefit of having the two different types of illumination optics is that they will produce different intensity patterns, encoding different information about the sample.

Detection Optics. FIG. 3 depicts detection optics 108. The detection optics includes objective 232, non-polarizing beam splitter 234, universal polarizer 335, relay lenses 342, 344, and 350, attenuating/phase-shifting mask 346, randomizer 348, and detector 352.

Light that leaves sample 104 is received by objective 232. In some embodiments, immersion media (e.g., water dipping or oil objectives) is used between sample 104 and objective 232. The use of such media limits loss of polarization signal due to refractive index mismatches, and enables an increase in numerical aperture and thus the collection of more light. It is important to preserve polarization, since any loss thereof equates to less interference at the detector, which means less information in the intensity patterns. However, high NA oil objectives have lower space bandwidth product than lower NA objectives, so there is a tradeoff between loss of polarization and maximum information-gathering capability.

Since reflection illumination optics 106B includes objective 232B (in the same position as objective 232 in detection optics 108), no additional objective is required in embodiments of microscope 100 that include illumination optics 106B. Non-polarizing beam splitter 234 is required for embodiments of microscope 100 that incorporate reflection illumination optics 106B. And non-polarizing beam splitter 234 is, in fact, included in illumination optics 106B.

After passing through non-polarizing beam splitter 234, light then enters universal polarizer 335, which includes electrically tunable waveplates 336 and 338. These waveplates are oriented 45 degrees with respect to one another. The waveplates are followed by linear polarizer 340, which, unlike the linear polarizers of universal polarizers 225A and 225B, is required. The universal polarizer enables light of a particular polarization coming from sample 104 to be selected. As described further below, by taking multiple measurements for such different selected polarizations, more information about the polarization-altering properties of the sample can be obtained.

As described above, both illumination optics (i.e., transmission 106A and reflection 106B) and detection optics 108, by virtue of the universal polarizer in such optics, produce light having a particular polarization. However, there is a distinction in what is being accomplished in the illumination optics versus the detection optics.

Universal polarizers 225A and 225B in respective illumination optics 106A and 106B each create a beam with a particular polarization by transforming linearly polarized laser light into some other arbitrary polarization state (linear along a different axis, circular, elliptical). No light is lost in this process, because the illumination light has the same polarization over its full cross section.

By contrast, the light scattered off of sample 104 (and heading to detection optics 108) does not have the same polarization across its whole cross section. This is because different points in sample 104 affect the part of the beam incident thereon differently. As a consequence, there is not one particular setting for universal polarizer 335 in detection optics 108 that can maximize the interference for every point on the sample. Rather, selecting different polarizations for the scattered light in the detection path will reveal information about different parts of the sample.

Universal polarizer 335 in the detection optics selectively attenuates some polarization components of the light coming from the sample (both scattered and ballistic light). Consequently, other components that haven't been attenuated can have their interference pattern measured without being superimposed on, and thus obscured by, the interference pattern that otherwise would have arisen from the attenuated light. Essentially, selecting a particular polarization removes the "background" to make a clearer measurement. And then another measurement is obtained wherein that which was just measured is removed to measure what was previously "background," etc.

So, to capture a great deal of information about sample 104, the light in the detection path is filtered for different polarizations (in successive observations), so that each polarization can be individually observed. At a minimum, two measurements, one for each polarization component, should be obtained. But it is advantageous to obtain more than two measurements.

It is important that as few as possible optical elements are present between objective 232 and universal polarizer 335, and that the curvature of their surfaces are minimized. The reason being that each time polarized light passes through a curved optical surface, a small amount of polarization purity is lost. The more this happens, the more polarization variations that are introduced by the sample become indistinguishable from background variations. This represents a loss of information.

Light from objective back aperture 233B is imaged through relay lenses 342 and 344 to plane 347, which is conjugate to back aperture 233B. The relay lenses focal lengths are not to scale; the distance between lenses 342 and 344 is twice the distance from lens 338 to objective back aperture 2338.

Positioned at plane 347 is attenuating/phase-shifting mask 346 and randomizer 348.

Attenuating/phase-shifting mask. In a weakly scattering/absorbing sample, such as a cell or group of cells, the majority of the incident light will pass unabsorbed/unscattered through the sample. This light is referred to herein as "ballistic light" or a "ballistic beam." Both transmission illumination optics 106A and reflection illumination optics 106B will generate such ballistic light. That is, some of the light that is directed to the sample in transmission optics 106A will pass unabsorbed/unscattered through the sample (the "transmission illumination ballistic beam"). With reflection illumination optics 106B, an analogous beam ("reflection illumination ballistic beam") will arise from a reflection off the glass surface on which the sample is held, never having passed through the sample.

The ballistic beam, regardless of whether it's sourced from the transmission or reflection illumination optics, will create a problem for microscope 100, unless the ballistic beam is modified. In most of the embodiments described herein, the ballistic beam will reach the detector through the detection optics, and is likely to be much brighter than the light scattered off of a sample. This is problematic because it lowers the contrast of the interference pattern formed by interference between the light scattered from the sample, and the unscattered ballistic beam. This is addressed by substantially equalizing the intensity of the ballistic beam to that of the light scattered off the sample.

In the illustrative embodiment, this equalization is accomplished using an attenuating/phase-shifting mask 346. The amount of attenuation is proportional to the ratio of the brightness of the ballistic light to the scattered light. This attenuation mask must be positioned in plane 347, which is the conjugate to the back aperture of objective 232. The reason is that in plane 347, different spatial positions correspond to different angles of light (in sample space), so such different angles of light can be attenuated differently. This conjugate plane is formed by imaging the back focal plane of objective 232 through relay lenses 342 and 344. Mask 346 also phase-shifts the ballistic light. Both effects—attenuating the ballistic light near to the magnitude of the reflected light, and phase shifting—generate high-contrast interference patterns.

The attenuating/phase-shifting feature 349 of mask 346 is depicted in FIG. 3 as a small dark circle within a larger clear aperture. Attenuation and phase shifting occurs at feature 349 (the small circle); the rest of the aperture can be considered to be a flat piece of glass. The location of feature 349 relative to the optical axis of detection optics 108 is determined by the angle of illuminating light. That is to say, attenuating/phase-shifting mask 346 (specifically feature 349) must be located so that it matches the position of the ballistic light. Since the ballistic light moves with different illumination angles, the mask must also move along plane 347. Such movement can be accomplished in any of a variety of ways; for example, attenuating/phase-shifting mask 346 placed in a rotation mount or translation mount. Alternatively, mask 346 can be implemented as a spatial light modulator with individually controllable pixels.

A comparison to Zernike phase contrast (ZPC) microscopy may be instructive. In ZPC, there is often illumination with an annulus of angles of light, so there is a corresponding annulus to attenuate the ballistic light. Another difference is that in ZPC, the attenuation occurs in the objective back focal plane (which is usually within the objective itself), not in a conjugate plane formed by imaging the back focal plane through two relay lenses as depicted in the embodiment of FIG. 3. It is not possible to attenuate in objective 232B when using reflection illumination optics 106B, because the illuminating beam itself would also pass through the attenuating feature in the objective.

Randomizer. In order to create a one-to-many imaging system with weakly scattering biological samples, a random phase mask (i.e., a diffuser) is placed in the pupil plane. This diffuser should have variations in phase greater than one-half the wavelength of the illumination light. This will ensure that the optical system's point spread function is randomized enough such that a one-to-many mapping is achieved. Randomizer 348 introduces phase variations into the incident light. So, notwithstanding the fact that optical aberrations are anathema in most optical systems, such aberrations in the detection optics are a non-issue for embodiments of the invention. In fact, the randomizing phase mask is actually introducing aberrations. This is the "one-to-many" mapping approach discussed earlier. This feature depends on the illumination light being coherent, so that high-contrast interference is achieved.

Randomizers located near plane 347 and having relatively rougher surfaces will scatter light more than randomizers with surfaces that are less rough. The greater diversity of angles to which light scatters, the more randomized the intensity pattern. But this will be associated with a relatively broader point-spread function. Compare FIG. 7A and FIG. 7B, which shows light scattered from relatively rougher randomizer 348B has a greater spread than that scattered from randomizer 348A. In fact, the introduction of randomizer 348 will create a point spread function that is significantly wider than the system's un-abberated, diffraction-limited point spread function. As a result, if not otherwise corrected, light from the edge of the field-of-view would be scattered outside of the detector, and will therefore not be detected.

In order to rectify this problem, an additional optical element—converging lens 760—is placed in the light path in between randomizer 348 and detector 352. Lens 760 bends back, onto the detector, light that would otherwise have missed the detector. This is depicted in FIG. 7C. By virtue of lens 760, detection optics 108 collects more light at the expense of making the system's point spread function vary over the surface of the detector. As a result, intensity patterns will be more difficult to algorithmically interpret, and additional calibration information is required.

Alternatively, lens 760 can, essentially, be incorporated into lens 350 by replacing lens 350 with a lens having a greater curvature. Another way of accomplishing the functionality of the randomizer would be to place, in the pupil plane, instead of a single diffuser, a multi-layer holographic diffuser that has been designed to achieve the same shift-varying point spread function.

In some embodiments, randomizer 348 is embodied as a diffuser, such as a rough glass surface. Relatively more or less randomization can be introduced as a function of the degree of roughness. If the variations in the glass height are greater than one-half wavelength of the interrogating light, the intensity pattern formed on the sensor will tend to look more like uninterpretable laser speckle. If the variations in glass height are smaller than one-half wavelength, the intensity pattern might appear as a human-interpretable image, though it will still have a coherent/speckly appearance.

Unlike attenuating/phase-shifting mask 346, randomizer 348 need not be located in plane 347. However, positioning randomizer 348 in plane 347 will imbue the system with shift-invariance. That is advantageous because the algorithm used in computer vision system 110 that must interpret the image will have a relatively less complex system model to learn. That is, there will be only one point-spread function compared to having a point-spread function for every point in the field of view.

In some other embodiments, rather than introducing randomization via randomizer 348, it is accomplished by randomizing the incident light beam. That is, rather than using, for example, a laser beam having an approximately uniform amplitude over its cross section, a random absorption pattern can be applied to provide random illumination.

Returning to the discussion of FIG. 3, randomizer 348 and attenuating/phase-shifting mask 346 are located between relay lenses 344 and 350. After passing relay lens 350, the light propagates to detector 352. Comparing the light leaving sample 104 from a "point" on the sample, to the light received by detector 352, this figure illustrates the "one-to-many" mapping of some embodiments of the present invention.

Detector 352, which in some embodiments is a digital camera, detects the intensity of the incident intensity pattern, digitizes it, and stores it in memory.

Figure 8:
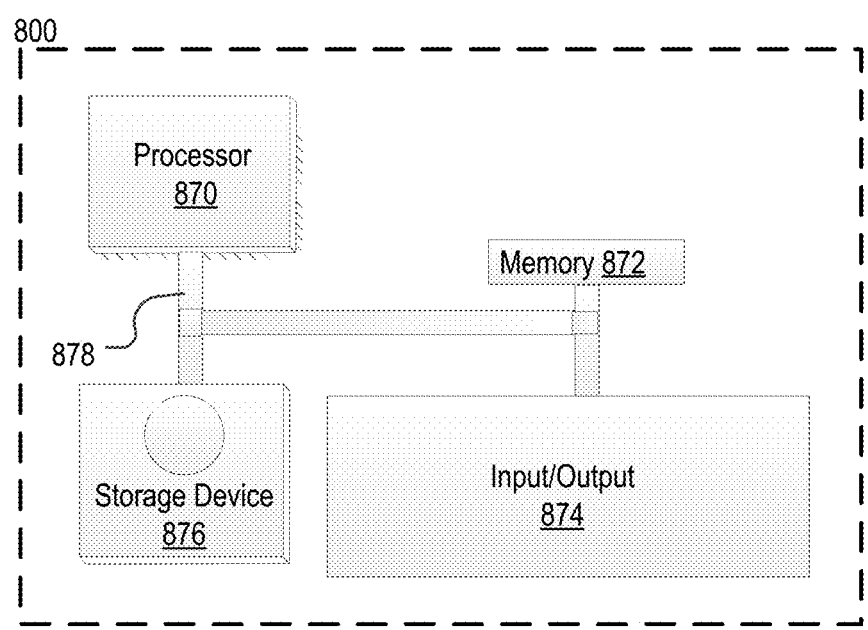
FIG. 8 depicts a processing system for use in interpreting an intensity pattern formed from the optics of the computational microscope of FIG. 1.

Computer Vision System. Computer vision system 110 (FIG. 1), using a suitable algorithm, processes the stored intensity pattern to extract useful information about sample 104. FIG. 8 depicts elements of system 800 suitable for processing the digitized intensity pattern and extracting information therefrom. System 800 includes processor 870, memory 872, storage device 876, and input/output structure (s) 874. One or more busses 878 typically interconnect components 870, 872, 876, and 874.

System 800 is suitable for implementing the methods described herein as stored program-control instructions. Those program-control instructions implement a suitable algorithm for the processing the intensity pattern. The elements of system 800 may be distributed between detector 352 and computer vision system 110. Additionally, processor 870 may be representative of plural processors, such as one or more operating in detector 352 and one or more operating in computer vision system 110. Moreover, system 800 may be implemented via discrete elements or one or more integrated components.

Processor 870 may be a special-purpose processor, or a general-purpose processor. Processor 870 executes instructions, such as those that implement an algorithm for extracting information from the intensity pattern. Furthermore, processor 870 is capable of populating, updating, using, and managing data in memory 872 and/or storage device 876. It will be clear to those skilled in the art how to make and use processor 870.

Memory 872 stores data, such as a digitized representation of an intensity pattern generated via microscope optics 102 (FIG. 1), and is a computer-readable medium, such as volatile or non-volatile memory. Storage device 876 provides storage for processing system 800 including, without limitation, instructions for execution by processor 870, as well as the results of executing such instructions. Storage device 876 is a non-volatile, non-transitory memory technology (e.g., ROM, EPROM, EEPROM, hard drive(s), flash drive(s), a tape device employing magnetic, optical, or other recording technologies, or other solid-state memory technology, CD-ROM, DVD, etc.). It will be clear to those skilled in the art how to make and use memory 872 and storage device 876.

Input/output structure(s) 874 provide input/output operations for system 100, and may include a keyboard, and/or a display, and/or a transceiver or other communications device, ports, etc., for communications via any appropriate medium and via any appropriate protocol. Data and/or information may be received and output using one or more of such input/output devices. In some embodiments, processing system 800, via input/output structure(s) 874, may receive data from detector 352.

As previously mentioned, in the illustrative embodiment of the invention, a suitable algorithm is used to extract information from the digitized, stored intensity pattern. In some embodiments, the algorithm is a physics-based model of the sample's optical properties. The model is used in order to make inferences about such optical properties. This approach is conventionally known as an "inverse problem." It is notable that this type of algorithm is only used in embodiments in which a human-interpretable image is required.

Better suited for embodiments of the invention than those discussed above are "machine learning" algorithms. Machine learning can be subdivided into "supervised" learning and "unsupervised" learning.

In supervised learning, a training set of examples is generated, which, in the context of the present invention, pair images from computational microscope 100 with measurements of some property of interest of the sample. The property could be, for example, the number or spatial distribution of particular molecules of interest, such as is measured by fluorescence labelling. In some other embodiments, it is a category of phenotypes, such as cells from a diseased patient versus healthy patient, or which particular cells have been treated with drug candidates. Using this training data, the algorithm is trained to predict the desired output as a function of an input image. This enables the algorithm to be extrapolated to regimes in which a property wasn't actually measured, but is instead predicted from the intensity pattern obtained from computational microscope 100.

With unsupervised learning, no secondary property of interest is measured. Instead, the algorithm is trained to mimic the distribution of measured data (i.e., the intensity patterns), and in doing so, learns to concisely summarize high-level properties of the data. For example, unsupervised learning applied to a distribution of cell-intensity patterns may be used learn to cluster the intensity patterns into different categories. These categories might capture and reveal an important property; for example, cells with different phenotypes.

In some further embodiments, hybrid approaches that utilize both supervised and unsupervised learning are also used. Such approaches can be used to make predictions based on the detected intensity patterns, or discover properties of a sample being imaged.

A particularly useful machine-learning algorithm for extracting information from the intensity patterns generated by some embodiments of the invention is a neural network (either supervised or unsupervised). Neural networks are able to learn complex, arbitrary functions from training data, which makes them particularly well suited to analyzing the intensity patterns generated by embodiments of the invention, which encode a great deal of information in complex ways. There are multiple subtypes or architectures of neural networks that may suitably be used in conjunction with the measurements performed by microscope optics 102. Two such architectures include "convolutional" and "transformer" neural networks. Convolutional neural networks have shown good results with image processing. Transformer neural networks are particularly flexibility in their ability to learn.

In light of this specification, those skilled in the art will be able to select an algorithm suitable for use in conjunction with embodiments of the invention, and code the algorithm into program control instructions, which can be executed by processor 870.

Calibration. Regardless of the algorithmic approach, the performance of most embodiments is improved by calibration. Calibration enables the algorithms to disambiguate situations in which variations in the detected intensity patterns are caused by some property of the instrument varying, or whether they represent actual differences in the sample being imaged. A simple example of this is when detected intensity patterns are dimmer in some cases. This might be the result of a sample that absorbs more light, which is an important distinction, or it might be caused by a fluctuation in the instrument's illumination power.

Calibration is performed either through "self-calibration" or "empirical calibration." In the former, parameters of the imaging system are estimated based only on the detected intensity patterns. In the latter, measurements are taken that are designed to directly measure these parameters. Such direct measurements are performed on a standardized sample, or no sample at all. Standardized samples include objects having properties that can be described in a statistical sense, like a diffuser with a known surface roughness (but an unknown exact pattern), or samples whose exact structure is known, for example by specifically fabricating a microscopic object for this purpose.

It is within the capabilities of those skilled in the art, in conjunction with the guidance provided in this specification, to calibrate microscope optics 102.

Figure 4:
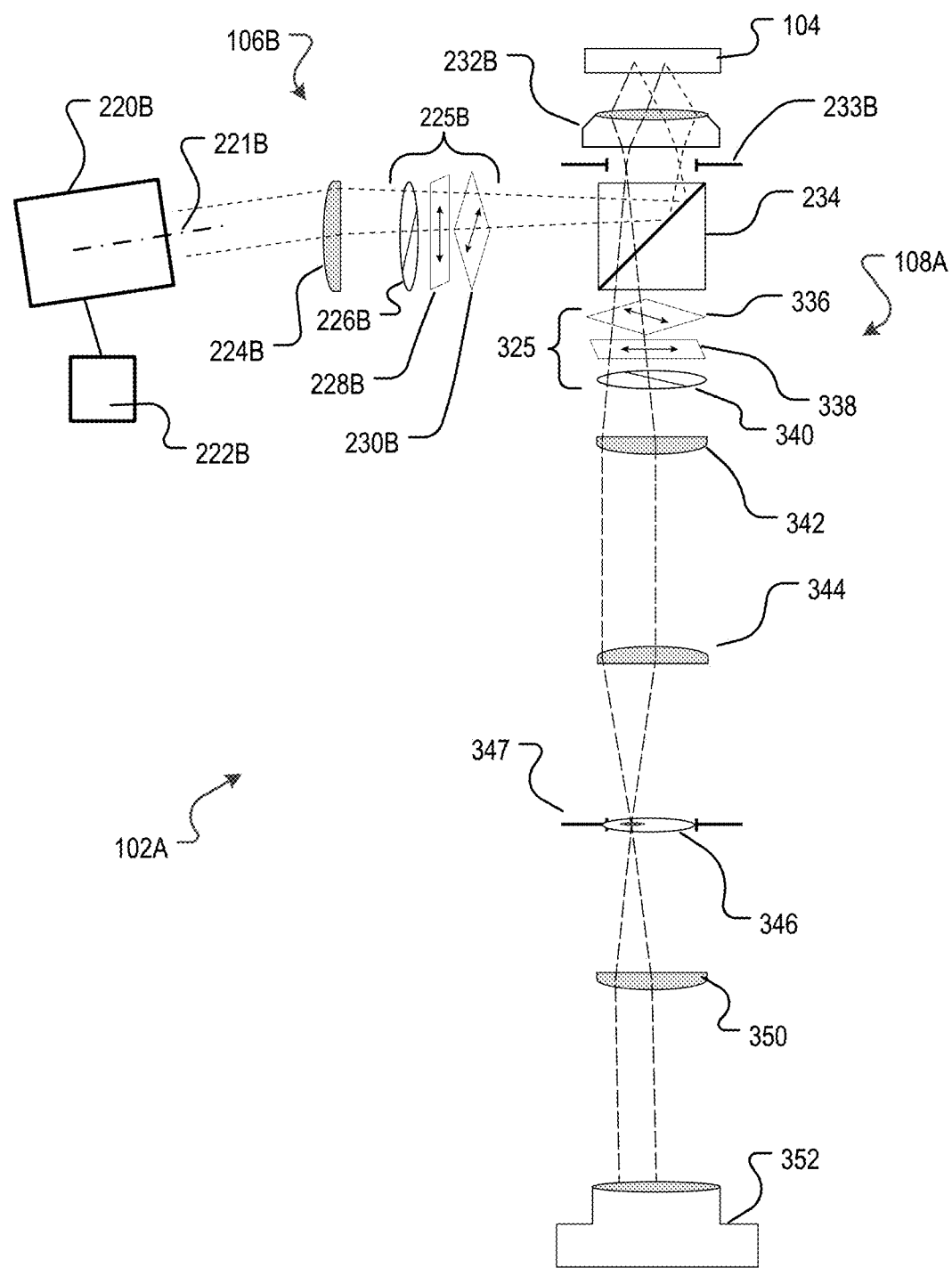
FIG. 4 depicts a first embodiment of the microscope optics of the computational microscope of FIG. 1, wherein the microscope optics include reflection-geometry illumination optics as shown in FIG. 2B, and an embodiment of the detection optics of FIG. 3 that includes only an attenuating/phase-shifting mask.

Embodiments of Microscope Optics. FIG. 4 depicts a first embodiment of computational microscope 100, which includes microscope optics 102A. Microscope optics 102A includes (reflection) illumination optics 106B (coherent light source 220B, positioner 222B, tube lens 224B, linear polarizer 226B, waveplate 228B, waveplate 230B, non-polarizing beam splitter 234, and objective 232B) and detection optics 108A. Unlike detection optics 108 of FIG. 3, detection optics 108A does not include randomizer 348. More particularly, detection optics 108A includes objective 232B, non-polarizing beam splitter 234, universal polarizer 325, relay lenses 342, 344, and 350, attenuating/phase-shifting mask 346, and detector 352. As previously discussed, non-polarizing beam splitter 234 and objective 232B are shared between illumination optics 106B and detection optics 108.

As discussed in conjunction with FIG. 2B, illumination optics 106B provides an angled plane wave of a particular polarization to sample 104. Light that is scattered due to its interaction with sample 104, as well as light (ballistic light) reflected from a surface (not depicted) that supports sample 104, is received by objective 232B and passes through non-polarizing beam splitter 234. Light passes through the rest of detection optics 108A, as described in conjunction with FIG. 3. However, as mentioned above, detection optics 108A does not include randomizer 348.

In operation, during various runs, optical axis 221B of coherent light source 220B is altered so that the plane wave incident on sample 104 has a different angle of incidence. Also, in various runs, the polarization of the illumination is altered via universal polarizer 225B. And in various runs, a desired polarization is selected via universal polarizer 325. Each such change in the optics will generate a different intensity pattern.

In the absence of randomizer 348, no randomizing occurs. But even without randomizing, this embodiment, which is quite unique in the use of a reflection illumination geometry in conjunction with phase and polarization control, is very advantageous for certain applications, such as for screening multi-well plates. This application is described further in conjunction with FIGS. 12A through 12C. Since randomizing is not taking place, the embodiment of depicted in FIG. 4 will produce more conventional (human-interpretable) images. It is likely, however, that multiple images obtained from multiple runs (as discussed above) would likely need to be combined for the image to be readily interpreted by humans.

Figure 5:
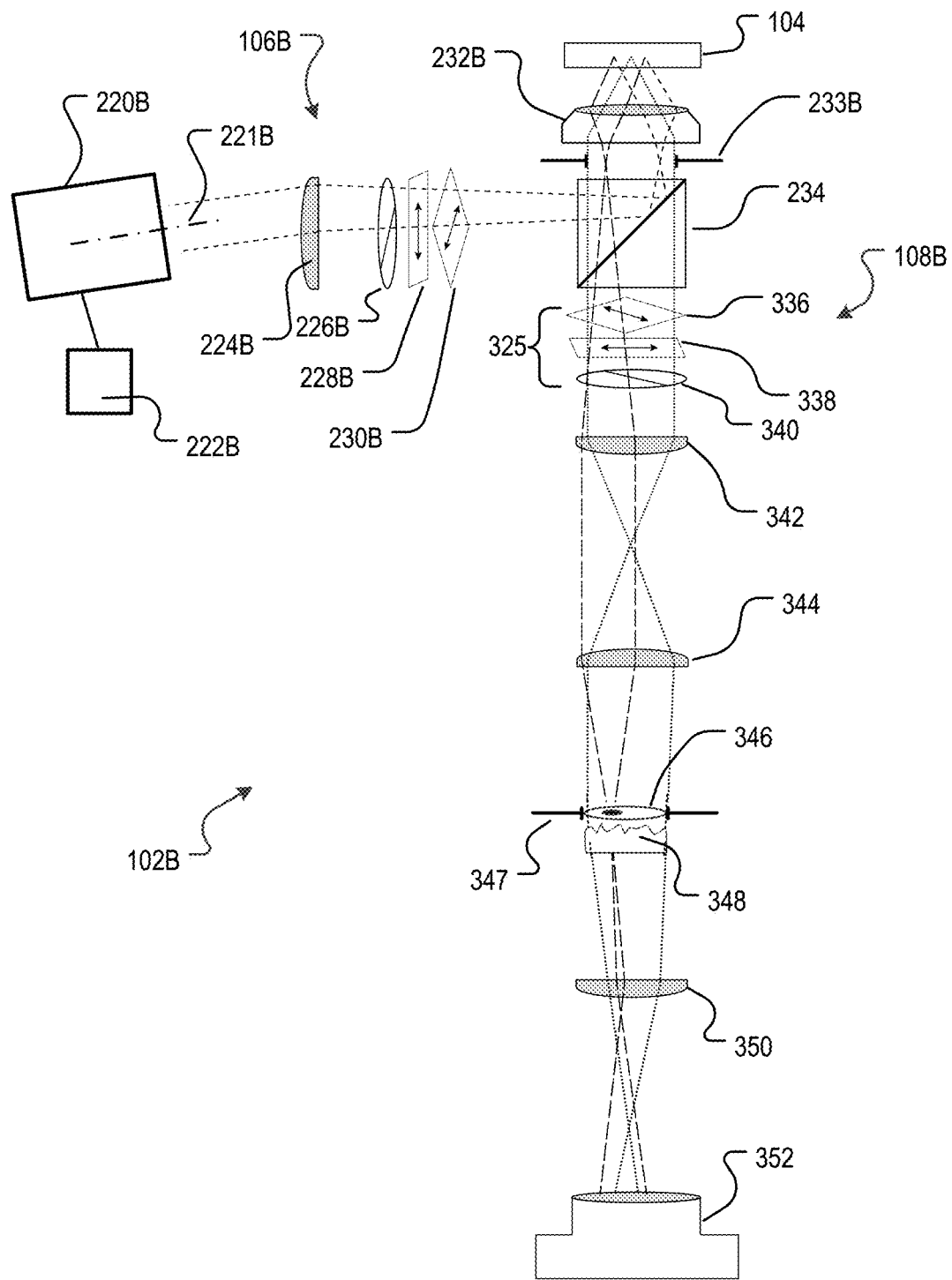
FIG. 5 depicts a second embodiment of microscope optics of the computational microscope of FIG. 1, wherein the microscope optics include reflection-geometry illumination optics as shown in FIG. 2B, and an embodiment of the detection optics of FIG. 3 that includes both a randomizer and an attenuating/phase-shifting mask.

FIG. 5 depicts a second embodiment of computational microscope 100, which includes microscope optics 102B. Microscope optics 102B includes (reflection) illumination optics 106B (coherent light source 220B, positioner 222B, tube lens 224B, linear polarizer 226B, waveplate 228B, waveplate 230B, non-polarizing beam splitter 234, and objective 232B) and detection optics 108B. Detection optics 108B includes both attenuation/phase-shifting mask 346 and randomizer 348, as well as objective 232B, non-polarizing beam splitter 234, universal polarizer 325, relay lenses 342, 344, and 350, and detector 352.

In addition to the run-to-run variations (altering optical axis 221B of coherent light source 220B, establishing polarization in the illumination optics, selecting illumination in the detection optics) possible via the microscope of FIG. 4, the presence of randomizer 348 in the microscope of FIG. 5 will enable additional intensity patterns to be generated by the optics and received by detector 352. Any change in the direction of the illuminating light will result in light interacting with randomizer 348 at different regions. This will alter the manner in which light scatters. Moreover, randomizer 348 itself can be changed between runs to another randomizer having a different surface profile.

FIG. 6 depicts a third embodiment of computational microscope 100, which includes microscope optics 102C. Microscope optics 102C includes both (transmission) illumination optics 106A and (reflection) illumination optics 106B, and of course detection optics 108B. More particularly, and as depicted in FIG. 2A, illumination optics 106A includes coherent light source 220A, positioner 222A, tube lens 224A, linear polarizer 226A, waveplate 228A, waveplate 230A, and objective 232A. Illumination optics 106B includes coherent light source 220B, positioner 222B, tube lens 224B, linear polarizer 226B, waveplate 228B, waveplate 230B, non-polarizing beam splitter 234, and objective 232B. And detection optics 108B includes objective 232B, non-polarizing beam splitter 234, universal polarizer 325, relay lenses 342, 344, and 350, attenuating/phase-shifting mask 346, randomizer 348, and detector 352.

The microscope depicted in FIG. 6 operates as previously described in conjunction with FIGS. 2A, 2B, and 3. Of course, with the addition of the transmission optics 106A, microscope optics 102C will be able to create additional intensity patterns (relative to microscope optics 102A and 102B). By definition, the additional (and different) intensity patterns obtained from the use of transmission illumination optics 106A will encode different information than the intensity patterns obtained from reflection illumination optics 106B.

Figure 9:
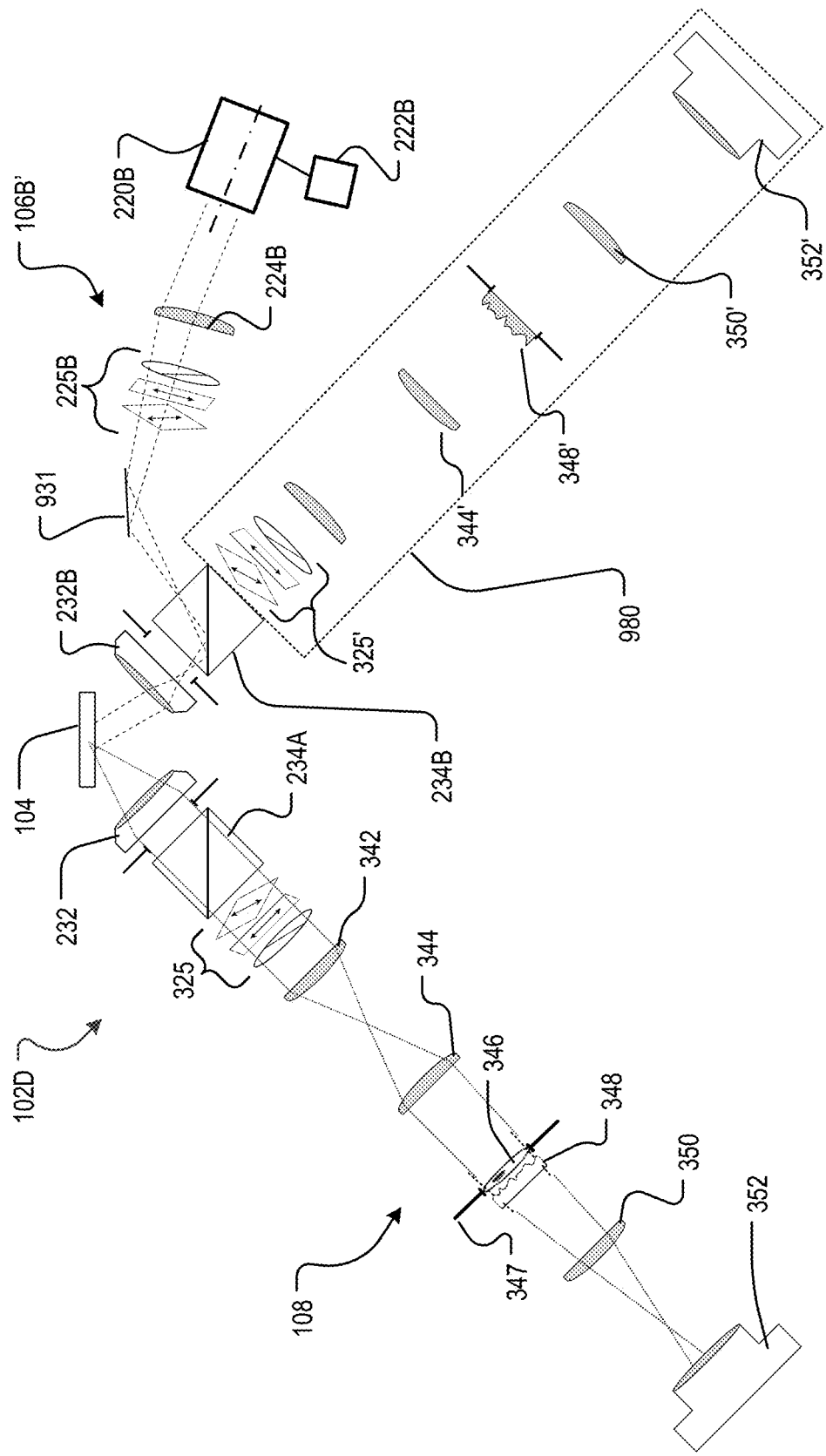
FIG. 9 depicts a fourth embodiment of microscope optics of the computational microscope of FIG. 1.

FIG. 9 depicts a fourth embodiment of computational microscope 100, which includes microscope optics 102D. This embodiment is particularly well suited to reflection illumination geometry. In the embodiment depicted in FIG. 9, illumination optics 106B' is situated on the right of the figure and detection optics 108 are situated on the left of the figure. Illumination optics 106B' is similar to illumination optics 106B; both employ reflection geometry. However, illumination optics 106B' includes mirror 931. This mirror is used so that the optics can all fit below sample 104.

Illumination optics delivers an angled plane wave to sample 104; detection optics 108 and its operation is identical to that shown in FIG. 3. Detection optics 980, which is situated on the right side of the figure, is not present in this embodiment.

There are a variety of other embodiments based on the arrangement of FIG. 9:
(i) In some other embodiments, detection takes place in both detection optics 980 as well as detection optics 108.
(ii) In some other embodiments, a second reflection illumination optics (which would be located on the "left" in FIG. 9, is used rather than illumination optics 106B'.

(iii) In some other embodiments, a transmission illumination optics is used.

(iv) In some other embodiments, rather than illuminating on the right and detecting on the left, both illumination and detection occurs in optics depicted on the right side of the figure. In such an embodiment, the microscope optics include illumination optics 106B' and detection optics 980; detection optics 108 is not present. In this embodiment, ballistic light is not captured by objective 232B; as such, an absorption/phase-change mask (i.e., mask 346) is not included.

(v) Any structural combination of the foregoing. That is, one reflection illumination optics on either side, two reflection illumination optics, one transmission illumination optics alone or with one or two reflection illumination optics. Detection optics on the same side or the opposite side from illumination optics, etc.

In the embodiments of microscope optics discussed above, both ballistic light and scattered light follow a common path through the detection optics. In some other embodiments, this is not the case. In particular, in some other embodiments, the ballistic light does not reach detector 352 through the detection optics. In some embodiments, this is accomplished via a variation of the embodiment depicted in FIG. 9, wherein the ballistic light does not reach detection objective 232. In some other embodiments, all ballistic light entering detection optics is absorbed in a version of attenuation/phase-shifting mask 346. For these embodiments, some of the illumination light that is launched from the coherent light source is directed to detector 352 via a path that avoids the detection optics. This light serves as a "reference beam." As long as the reference beam and the scattered light originate from the same coherent light source and as long as the polarizations are similar to one another (in particular, not perpendicular to one another), they will interfere to produce an intensity pattern containing a substantial amount of encoded information. An exemplary embodiment of microscope optics capable of operating in this manner is depicted in FIG. 10.

Figure 10:
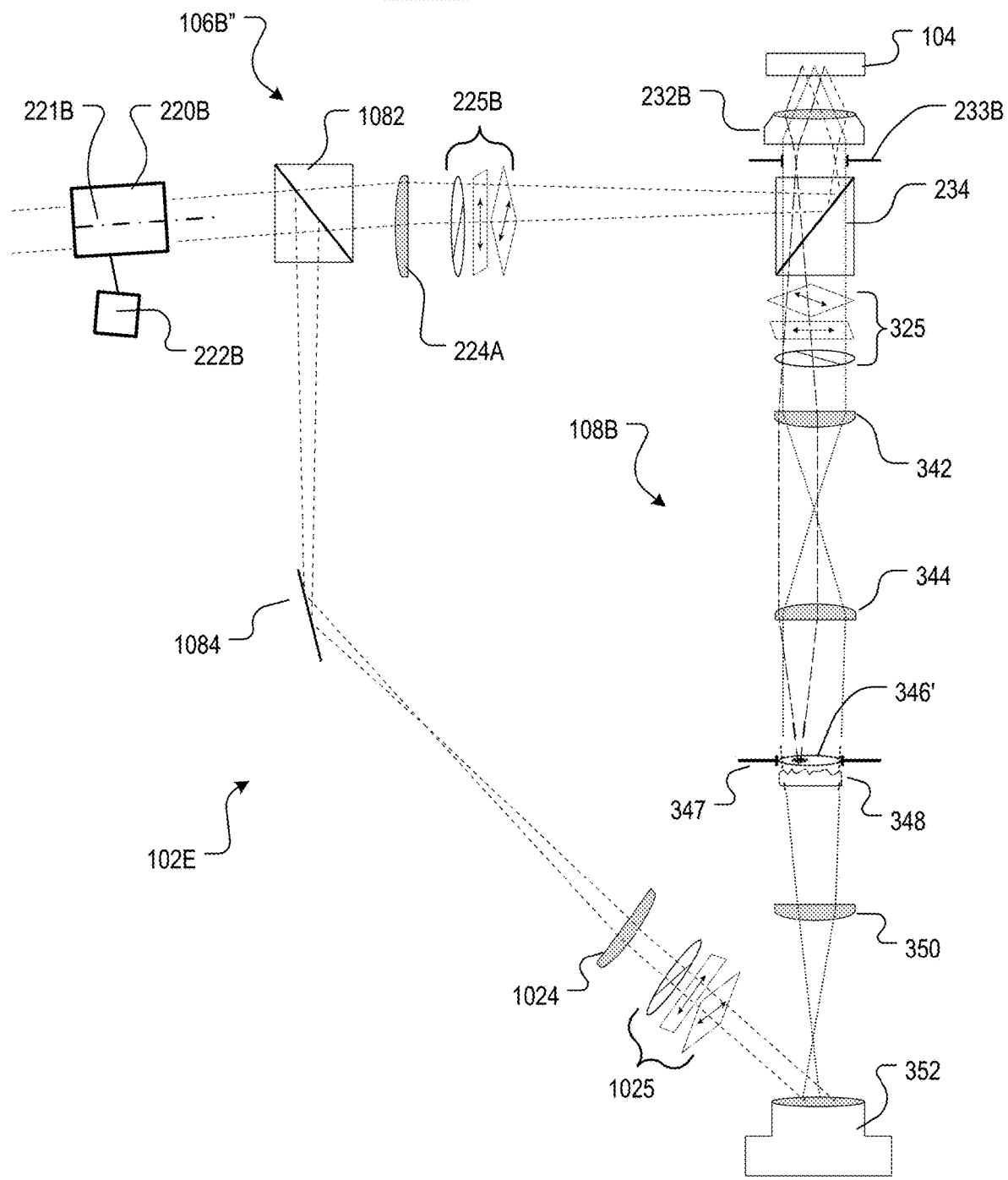
FIG. 10 depicts a fifth embodiment of microscope optics of the computational microscope of FIG. 1.

FIG. 10 depicts a fifth embodiment of computational microscope 100, which includes microscope optics 102E, wherein the ballistic light avoids the detection optics as described above.

Microscope optics 102E includes illumination optics 106B", which is a modified version of (reflection) illumination optics 106B. In particular, illumination optics 106B" includes beam splitter 1082, which redirects a portion of the coherent light launched from coherent light source 220B. The redirected light is reflected off of mirror 1084 and is directed to tube lens 1024 and universal polarizer 1025. These elements are identical to those positioned between beam splitter 1082 and beam splitter 234. After exiting universal polarizer 1025, the light is directed to detector 352. Universal polarizer 1025 sets the polarization of the "reference" beam to the same polarization as set by universal polarizer 325.

The coherent light that is not redirected by beam splitter 1082 reaches the sample as an angled plane wave with a desired polarization. Scattered light and ballistic light are received by objective 232B, and polarization is selected in universal polarizer 325. The light passes through relay optics (i.e., lenses 342 and 344) and reaches attenuating/phase-shifting mask 346'. Unlike the mask 346 of the previous embodiments, mask 346' absorbs all ballistic light incident thereon. The scattered light passes mask 346' and is incident upon randomizer 348. This light then passes through lens 350 and is incident upon detector 352.

Because the reference beam and scattered light that are incident upon detector 352 meet the aforementioned requirements regarding source and polarization, they interfere to generate an intensity pattern.

Figure 11:
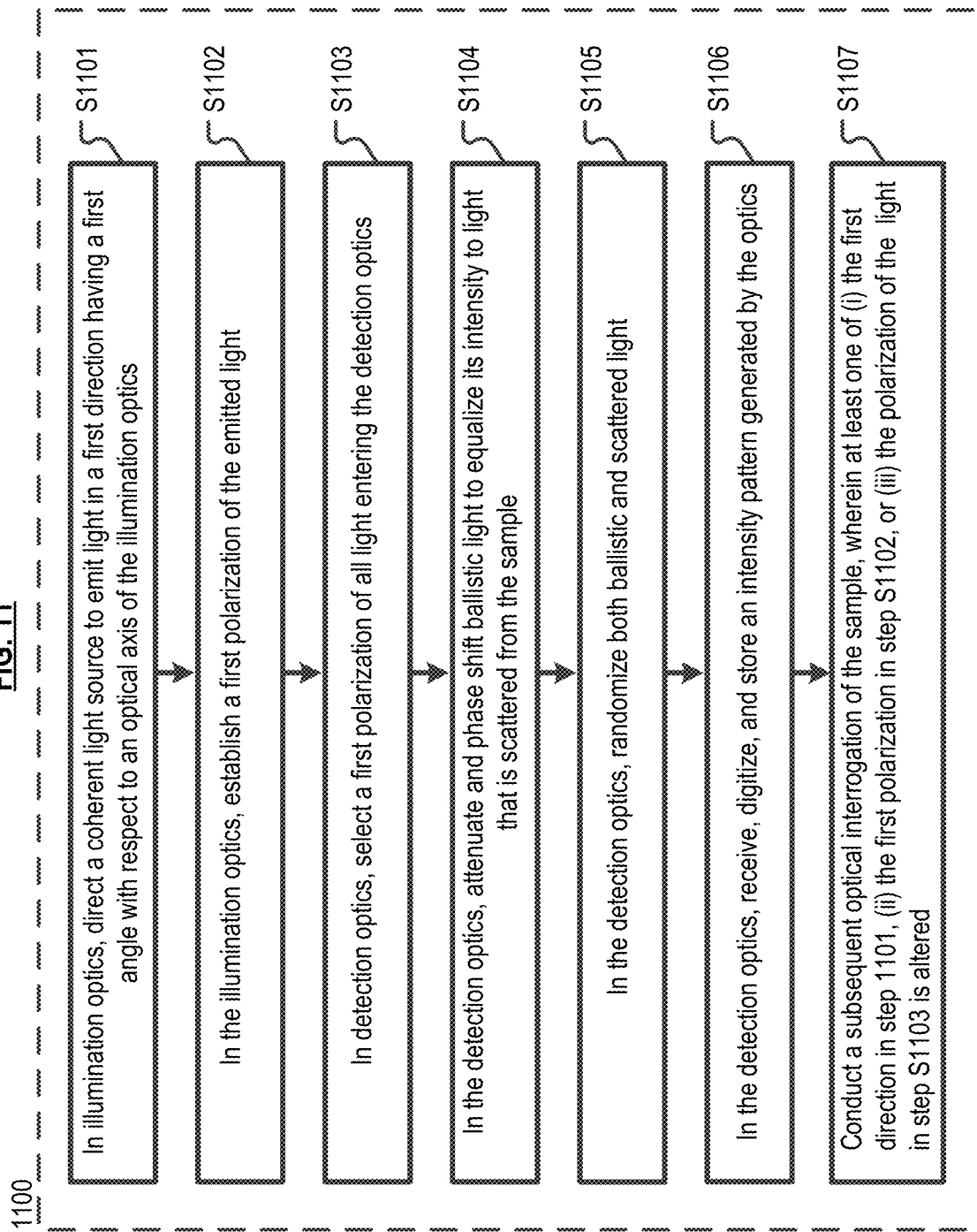
FIG. 11 depicts a method for operating a computational microscope in accordance with the present invention.

FIG. 11 depicts method 1100 for operating microscope optics 102 of a computational microscope in accordance with the present teachings. In accordance with operation S1101, a coherent light source (i.e., source 220A in transmission illumination optics 106A or source 220B in reflection illumination optics 106B) emits light at some controllable angle (which can be 0°) with respect to an optical axis of the illumination optics.

In operation S1102, a first polarization is established, such as by a universal polarizer (i.e., universal polarizers 225A and/or 225B). This light then enters an objective lens, which directs an angled plane wave having the first polarization to a sample.

In operation S1103, a second polarization is selected for light entering the detection optics. In operation S1104, in the detection optics, ballistic light is attenuated to substantially equalize its amplitude to that of the scattered light. The attenuation, which is conducted via a mask, also shifts the phase of this ballistic light to maximize contrast of the interference pattern.

In operation S1105, in the detection optics, all of the light (i.e., ballistic as well as scattered light) is randomized, such as by a diffuser, which introduces phase variations in the light.

In operation S1106, in the detection optics, an intensity pattern is received by the detector. The intensity pattern is then digitized and stored.

In operation S1107, another optical interrogation is conducted, wherein at least one of the following is altered: (i) the direction in which the light is launched into the illumination optics (and, correspondingly, the position of the attenuating/phase shifting mask to match the resulting altered location of the ballistic light); (ii) the polarization established for the light propagating through the illumination optics; (iii) the selected polarization of the light entering the detection optics; (iv) the randomizer may be exchanged for another having a different surface profile.

The method applies to any of the embodiments of microscope optics described herein. It is notable that in some embodiments, operation S1106 (randomization) is not performed, such as in microscope optics 102A depicted in FIG. 4.

High-Throughput Screening. Embodiments of the invention are particularly well suited for high-throughput screening of cells in multi-well plates. The geometry of these plates imposes some unique constraints on imaging systems. For a standard multi-well plate with wells 1290 having vertical walls, as depicted in FIG. 12A, the numerical aperture of transmission-mode illumination optics 106A will be limited based on the angle of the sides of the well. This will limit the angles of scattered light that can be collected, and the information that such light contains. The reflection-mode illumination optics is unaffected by this consideration.

In some embodiments, this limitation is address by using specialized multi-well plates. As depicted in FIG. 12B, rather than having wells with vertical walls, the walls of wells 1292 have a taper, wherein each well is widest at the mouth, tapering to a narrow diameter proximate to the bottom of the well. This enables use larger angles of illumination light for transmission mode illumination optics. In the illustrative embodiment, the well tapers linearly. The larger the angle of taper, the larger the transmission illumination NA can be used.

Figure 12C:
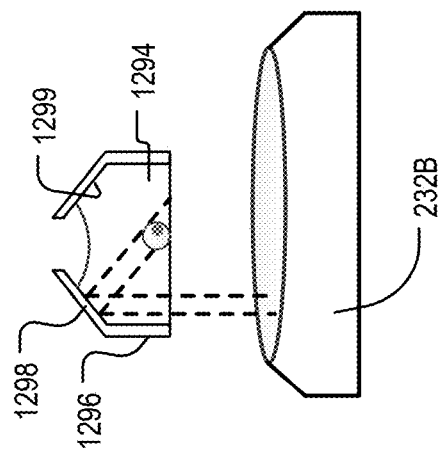
FIG. 12C depicts a second embodiment of a multi-well plate for use in conjunction with some embodiments of the present invention.
Figure 12B:
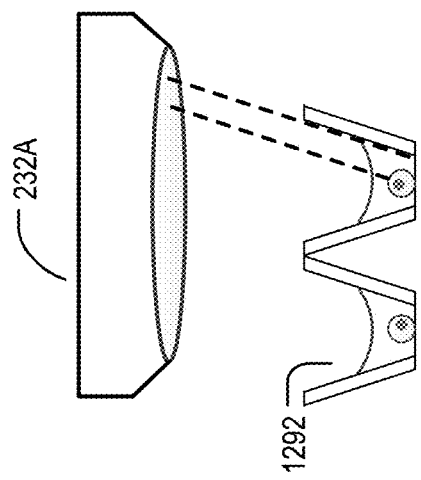
FIG. 12B depicts a first embodiment of a multi-well plate for use in conjunction with some embodiments of the present invention.
Figure 12A:
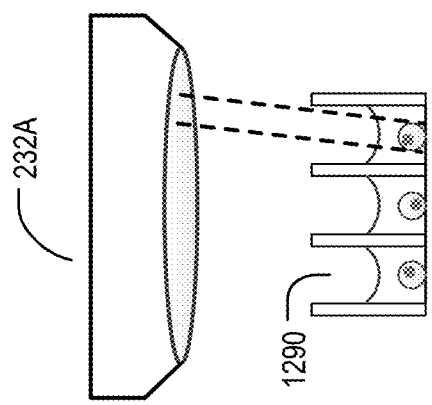
FIG. 12A depicts several wells in a prior-art multi-well plate being interrogated by light from a microscope.

In some other embodiments, such as depicted in FIG. 12C, each well 1294 in a multi-well plate has an upper portion of the well (near to the mouth) with sidewalls 1298 that taper outwardly (i.e., to a larger diameter), wherein sidewalls 1298 have a high-reflection coating 1299 disposed thereon. The lower portion of well 1294 has vertical sidewalls 1296. For this embodiment, high angles of transmission geometry light can be created using only a reflection geometry objective; that is, objective 232B.

A substantial amount of time may be required to generate a desired number of intensity patterns, one by one. In some embodiments, the architecture is modified to address this. In particular, rather than selecting a single polarization in the detection optics, multiple beam splitters are used to send different polarizations to different detectors. See, e.g., WO 2021/242741. In some other embodiments, the microscope optics are capable of simultaneously illuminating a sample from multiple angles. By way of illustration, in one embodiment, two beams are used, one at +10 degrees and another at −10 degrees relative to the optical axis, both from transmission illumination optics or both from reflection illumination optics. In some further embodiments, illumination is provided by a ring of light at some angle (e.g., 10 degrees, etc. relative to the optical axis. It is to be understood that for either of these approaches, there is no particular limitation on the angular orientation for the beams.

It is to be understood that the disclosure describes a few embodiments and that many variations of the invention can easily be devised by those skilled in the art after reading this disclosure and that the scope of the present invention is to be determined by the following claims.

What is claimed:

1. A system comprising microscope optics, the microscope optics comprising:
   first illumination optics for launching first coherent light within a range of controllable angles, establishing a first polarization of the launched first coherent light, and delivering an angled plane wave having the first polarization to a sample; and
   detection optics, wherein the detection optics includes:
   (a) an objective lens that receives ballistic light and scattered light, both originating from the angled plane wave delivered to the sample, wherein the ballistic light is not scattered by the sample, and the scattered light is scattered by the sample,
   (b) a detection-optics universal polarizer for selecting a second polarization of the ballistic light and the scattered light,
   (c) an attenuating/phase-shifting mask for attenuating the ballistic light and shifting a phase thereof, wherein the ballistic light is attenuated to substantially match an intensity of the scattered light, and wherein the mask is disposed in a plane that is conjugate to a back aperture of the objective lens;
   (d) a first randomizer that scatters the attenuated ballistic light, and further scatters the scattered light; and
   (e) a detector for receiving an intensity pattern formed from interference between the attenuated ballistic light and the scattered light.

2. The system of claim 1 wherein the detector digitizes the intensity pattern and stores the intensity pattern.

3. The system of claim 2 wherein the detector stores additional digitized intensity patterns obtained from interrogating the sample after making one or more changes to the microscope optics, wherein the changes are selected from the group consisting of: altering the angle at which the first coherent light is launched, altering the polarization of the launched first coherent light, and selecting a third polarization of the ballistic light and the scattered light, and replacing the first randomizer with a second randomizer, wherein the two randomizers have different surface profiles.

4. The system of claim 3 comprising a computer vision system, wherein the computer vision system retrieves the stored digitized intensity patterns and processes same using a machine learning algorithm, stored as program control instructions, thereby extracting information from the digitized intensity patterns.

5. The system of claim 1 comprising second illumination optics for launching second coherent light within a range of controllable angles, establishing a second polarization of the launched second coherent light, and delivering an angled plane wave having the second polarization to the sample.

6. The system of claim 5 wherein the first illumination optics has a reflection mode architecture and the second illumination optics has a transmission mode architecture.

7. The system of claim 1 wherein the first illumination optics has a reflection mode architecture.

8. The system of claim 1 comprising a first positioner for controlling the angle of launch of the first coherent light.

9. The system of claim 1 wherein the detection optics comprises: a non-polarizing beam splitter that is optically downstream of the objective lens, and two relay lenses, wherein the relay lenses project the back aperture of the objective lens.

10. The system of claim 1 further comprising a multi-well plate, the multi-well plate having a plurality of sample wells, wherein walls of each sample well taper inwardly.

11. A system comprising microscope optics, the microscope optics comprising:
   first illumination optics for launching first coherent light within a range of controllable angles, splitting the launched first coherent light into a first beam and a second beam, wherein the first illumination optics:
   (i) establishes a first polarization for the first beam, and delivers the first beam as an angled plane wave to a sample;
   (ii) establishes a second polarization for the second beam, and delivers the second beam to a detector, by passing the sample; and
   detection optics, wherein the detection optics receives ballistic light and scattered light, both originating from the plane wave delivered to the sample, wherein the ballistic light is not scattered by the sample, and the scattered light is scattered by the sample, and wherein the detection optics includes:
   (a) a detection-optics universal polarizer for selecting the second polarization for the ballistic light and the scattered light,
   (b) an attenuating/phase-shifting mask for absorbing all ballistic light;
   (c) a randomizer that further scatters the scattered light; and
   (d) a detector for receiving the first beam and the scattered light from the randomizer.

12. The system of claim 11 wherein the first illumination optics comprise:
   a first beam splitter that splits the first coherent light into the first beam and the second beam, and that establishes a first optical path for first beam that leads to the sample and a second optical path for the second beam that bypasses the sample and leads to the detector;

a first universal polarizer positioned along the first optical path, wherein the first universal polarizer establishes the first polarization for the first beam;
a second beam splitter downstream of the first universal polarizer along the first optical path;
a mirror positioned along the second optical path; and
a second universal polarizer downstream of the mirror and positioned along the second optical path, wherein the second universal polarizer establishes the second polarization for the second beam.

13. The system of claim 11 wherein at the detector, the first beam and the scattered light from the randomizer form an intensity pattern, and wherein the detector digitizes the intensity pattern and stores the intensity pattern.

14. The system of claim 13 wherein the detector stores digitized intensity patterns obtained from interrogating the sample after making one or more changes to the microscope optics, wherein the changes are selected from the group consisting of: altering the angle at which the first coherent light is launched, altering the polarization of the launched first coherent light, and selecting a third polarization of the ballistic light and the scattered light, and replacing the first randomizer with a second randomizer, wherein the two randomizers have different surface profiles.

15. The system of claim 14 comprising a computer vision system, wherein the computer vision system retrieves the stored digitized intensity patterns and processes same using a machine learning algorithm, stored as program control instructions, thereby extracting information from the digitized intensity patterns.

16. A method for generating a first intensity pattern and a second intensity pattern of a sample via a microscope, the method comprising:
launching, at a first angle, coherent illuminating light into first illumination optics;
establishing a desired polarization for the coherent illuminating light;
imaging the coherent illuminating light having the desired polarization onto the sample;
receiving, at a universal polarizer, ballistic light and scattered light, both originating from the coherent illuminating light imaged onto the sample, wherein the ballistic light is not scattered by the sample, and the scattered light is scattered by the sample, and selecting a desired polarization for the ballistic and scattered light;
attenuating the ballistic light to substantially equalize the intensity thereof to the intensity of the scattered light, and altering a phase of the ballistic light;
randomizing the ballistic light and the scattered light;
detecting a first intensity pattern resulting from interference between the ballistic light and the scattered light;
digitizing the first intensity pattern;
storing the digitized first intensity pattern; and
generating a second intensity pattern that is digitized and stored, by altering at least one of the following: the first angle at which the coherent illuminating light is launched, the desired polarization of the coherent illuminating light, the selected polarization of the ballistic and the scattered light.

17. A method for generating a first intensity pattern and a second intensity pattern of a sample via a microscope, the method comprising:
launching, at a first angle, coherent illuminating light into first illumination optics;
establishing a desired polarization for the coherent illuminating light;
imaging the coherent illuminating light having the desired polarization onto the sample;
receiving, at a universal polarizer, ballistic light and scattered light, both originating from the coherent illuminating light imaged onto the sample, wherein the ballistic light is not scattered by the sample, and the scattered light is scattered by the sample, and selecting a desired polarization for the ballistic and scattered light;
attenuating the ballistic light to substantially equalize the intensity thereof to the intensity of the scattered light, and altering a phase of the ballistic light;
randomizing the ballistic light and the scattered light;
detecting a first intensity pattern resulting from interference between the ballistic light and the scattered light;
digitizing the first intensity pattern;
storing the digitized first intensity pattern; and
generating a second intensity pattern that is digitized and stored; and
retrieving the first and second digitized intensity patterns and processing same using a machine-learning algorithm, stored as program control instructions, thereby extracting information from the first and second intensity patterns.

* * * * *